United States Patent [19]

Ohnuki

[11] Patent Number: 4,805,163

[45] Date of Patent: Feb. 14, 1989

[54] TRACKING CONTROL UNIT IN INFORMATION REPRODUCING APPARATUS

[75] Inventor: Nobutaka Ohnuki, Tokyo, Japan

[73] Assignee: Hitachi, Ltd., Tokyo, Japan

[21] Appl. No.: 941,803

[22] Filed: Dec. 15, 1986

[30] Foreign Application Priority Data

Dec. 13, 1985 [JP] Japan .................................. 60-278959
Dec. 13, 1985 [JP] Japan .................................. 60-278960
Dec. 13, 1985 [JP] Japan .................................. 60-278958

[51] Int. Cl.⁴ .............................................. G11B 7/095
[52] U.S. Cl. ........................................ 369/44; 369/46; 250/202
[58] Field of Search ........................... 369/44, 54, 46; 250/202; 360/77

[56] References Cited

U.S. PATENT DOCUMENTS

| | | | |
|---|---|---|---|
| 4,067,044 | 1/1978 | Maeda | 369/44 |
| 4,138,663 | 2/1979 | Lehureau | 369/44 |
| 4,268,745 | 5/1981 | Okano | 369/46 |
| 4,365,324 | 12/1982 | Michaelis | 369/44 |
| 4,371,899 | 2/1983 | Ceshkovsky | 360/36.1 |
| 4,615,023 | 9/1986 | Inada | 369/44 |
| 4,630,250 | 12/1986 | Nonomura | 369/44 |
| 4,680,594 | 7/1987 | Bracht | 369/54 |

Primary Examiner—Alan Faber
Attorney, Agent, or Firm—Antonelli, Terry & Wands

[57] ABSTRACT

In reproducing recorded information from a track on an optical disc by the use of a light beam, a tracking servo is employed for enabling the light beam to follow up the track. When there occurs any tracking deviation due to some flaw or the like on the track, the tracking servo is switched off if the number of times of such tracking deviation has exceeded a predetermined value within a preset time, and simultaenously a braking action is executed to impede the movement of the light beam. The braking force is adjustable in accordance with the velocity of the light beam movement.

7 Claims, 5 Drawing Sheets

4,805,163

TRACKING CONTROL UNIT IN INFORMATION REPRODUCING APPARATUS

BACKGROUND OF THE INVENTION

The present invention relates to a tracking control unit for use in an information reproducing apparatus.

In an information reproducing apparatus such as a video disc player, a compact disc player or the like, several servo systems are employed for obtaining reproducing information for reproduction of high quality pictures, for example. A first servo system is an autofocus servo system which drives an object lens for focusing a light beam emitted from a laser light source onto the surface of a video disc. A second servo system is a tracking servo system which moves the object lens in a radial direction of the disc for maintaining a focused light spot to impinge on an information track recorded on the video disc. An example of the tracking servo system is shown in FIG. 9 of U.S. Pat. No. 4,371,899. However, no contrivance is effected therein with regard to correction for resuming proper tracking upon occurrence of any tracking deviation.

SUMMARY OF THE INVENTION

It is an object of the present invention to provide a tracking control unit which is capable of performing prompt correction to resume proper tracking.

The preferred embodiments described herein are illustrative and not restrictive, the scope of the invention being indicated by the appended claims and all variations which come within the meaning of the claims are intended to be embraced therein.

DESCRIPTION OF THE PREFERRED EMBODIMENT

Figure 1:
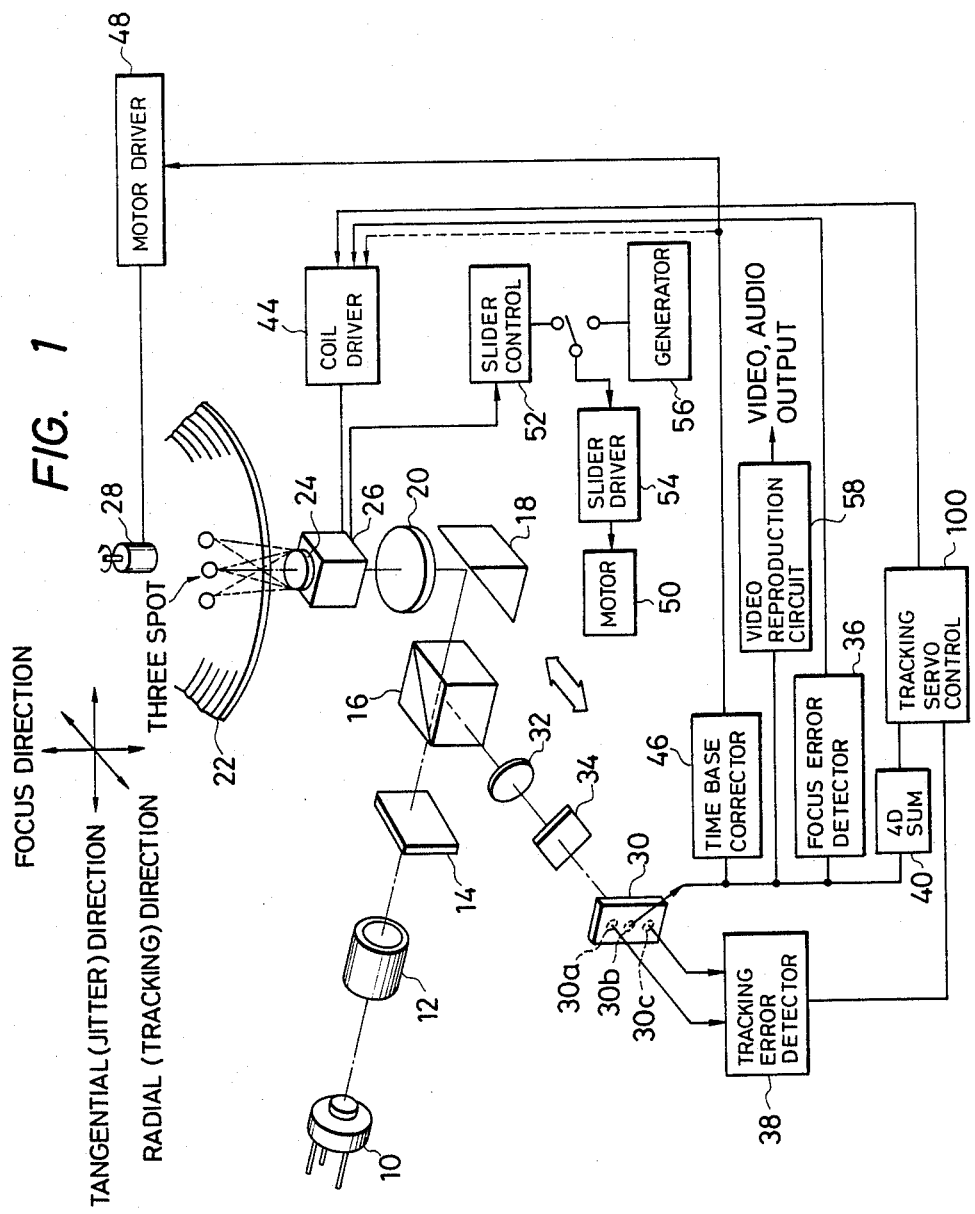
FIG. 1 illustrates a block diagram of principal parts of the present invention.

FIG. 1 shows a block diagram of principal parts in an optical video player. In this diagram, a light beam emitted from a laser diode 10 is first collimated by a collimator lens 12 and then is split into three beams via a diffracting grating 14 for forming three separated light spots on a disc 22. The two beams forming light spots on both sides of a center light spot are used for tracking error detection while the center beam forming the center light spot is used for focus error detection, time base error detection and reproducing signal detection.

The beams passing through a deflection beam splitter 16 are reflected by a triangular reflecting mirror 18 and are converted via a ¼ wavelength plate 20 into circular deflection beams, which are deflected in a tangential direction and a radial direction of a track of the disc 22 by an object lens 24 installed in a three-dimensional actuator 26. The disc 22, which is an information recording medium, is rotated by a spindle motor 28 at a rate of, e.g. 1,800 r.p.m. for a CLV (Constant Linear Velocity) disc. The beams are modulated by the pits formed on the disc 22 and then are reflected by a reflecting surface of the disc, so that the rotational direction of the circular deflection of the beams are reversed.

The reflected beams are picked up by the object lens 24 and are passed through the ¼ wavelength plate 20. The reflected beams are converted to linear deflections light in the direction orthogonal to the incident beam and, after reflection by the mirror 18, are deflected by the deflection beam splitter 16 to reach a photodiode array 30 through a lens 32 and a cylindrical lens 34. The cylindrical lens 34 is required for the detection of a focus error signal.

The beams reflected by the disc 22 and then reflected by the beam splitter 16 pass through the cylindrical lens 34 and are applied to the light receiving surface of the photodiode array 30. When the disc 22 is inadequately spaced apart from or close to the focusing position of the object lens 24, an oval light spot is projected to the light receiving surface of the photodiode array 30b, whereby the focus error voltage can be detected by a focus error detector 36. The center photodiode array 30b is split into four parts and serves for the detection of a focus error signal.

At the same time, the ± dimensional light split by the grating 14 focuses as slightly separated spots from the center light spot on the same track via the object lens 24, and the respective reflected light beams from both sides of the center light spot are detected by the signal photodiode arrays 30a and 30c. The track position is detected from the difference between the respective reflected light beams, and the tracking error voltage is detected by a tracking error detector 38. A 4D summing circuit 40 produces a sum output of the four parts of the center photodiode 30b. And a tracking servo control circuit 100 produces a control signal in response to the outputs of the 4D summing circuit 40 and the tracking error detector 38.

The focus error signal and the control signal are respectively applied to a coil driver 44. Then the coil driver 44 feeds a control current to the respective coils of the three-dimensional actuator and thereby controls the position of the object lens 24 in the radial direction of the track on the disc 22 and also in the vertical direction to the disc 22.

A time base corrector 46 detects a time base error signal (jitter error signal) from an FM signal produced from the center photodiode array 30b. The time base error signal is applied to a motor driver 48 and the coil driver 44. The object lens 24 is driven in the tangential direction of the track for correcting a time base error. The rotational speed and the rotational phase of the spindle motor 28 is controlled for correcting the time base error.

The output signal from the center photodiode array 30b is applied to a video reproduction circuit 48 to be converted into a video signal.

The aforesaid laser diode 10, collimator lens 12, diffracting grating 14, beam splitter 16, mirror 18, plate 20, actuator 26, lens 32, cylindrical lens 34 and photodiode array 30 are held integrally by an optical head (not shown). This optical head is displaceable in the radial direction of the disc 22 by a slider motor 50. Normally the slider is driven by a signal fed from a slider control circuit 52 through a slider driver 54 in accordance with the radial movement of the object lens 24 in the actuator 26. Meanwhile, when the optical head is displaced a long distance in the radial direction of the disc, a signal is fed from a pulse generator 56 to the slider driver 54.

Figure 2:
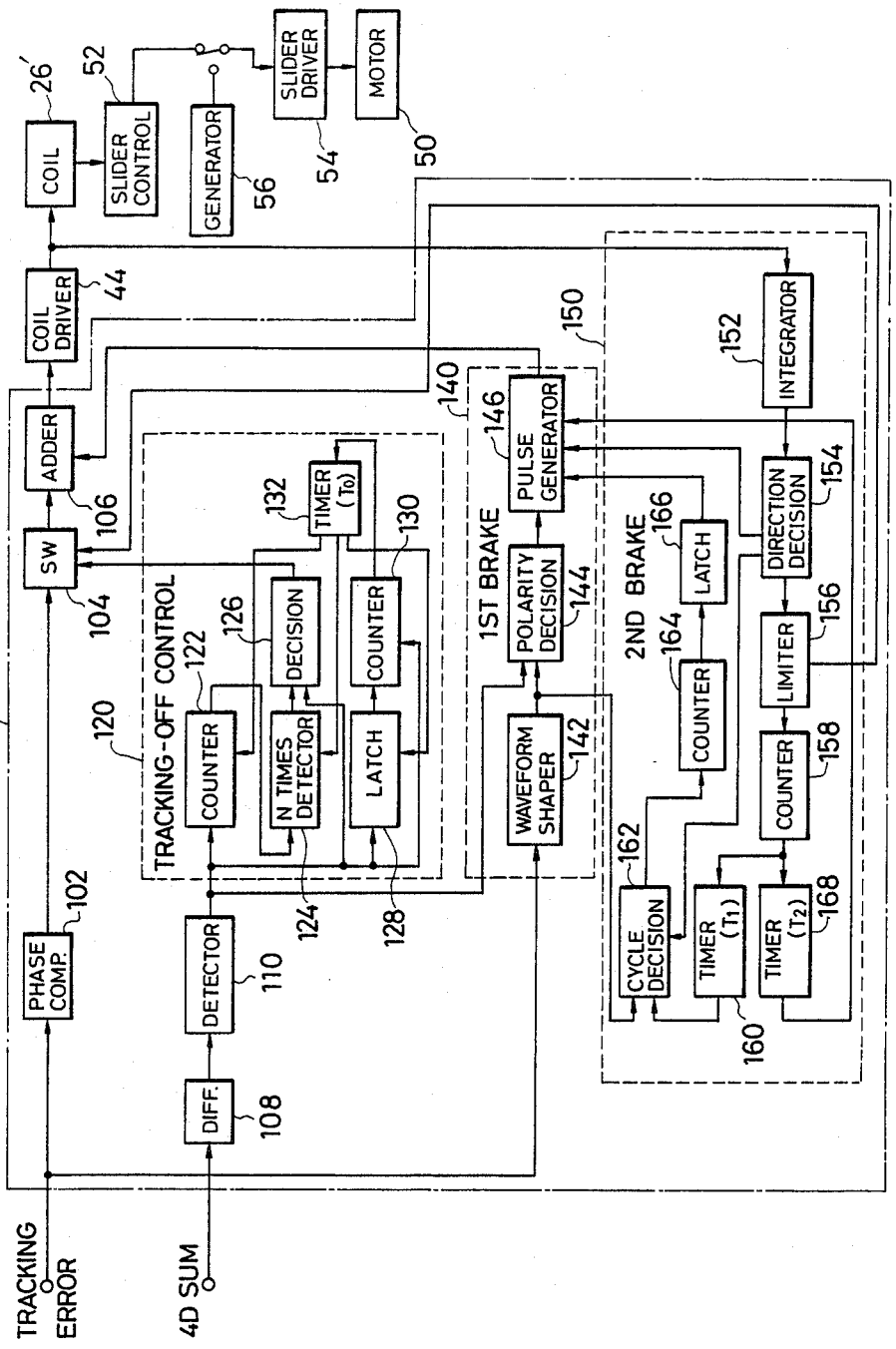
FIG. 2 illustrates a block diagram of major parts of the present invention.

The feature of the present invention resides in the tracking servo control circuit 100, which will be described in detail below with reference to FIG. 2.

A tracking error signal for following up the track of a recording medium is fed from the tracking error detector 38 to a phase compensator 102. In a normal reproduction mode, this tracking error signal is so adjusted as to have required servo-control transmission characteristic by the phase compensator 102 and is amplified by an amplifier incorporated in the coil driver 44 with a loop switch 104 closed. The signal thus amplified is then applied to a tracking driver coil 26' to execute follow-up of the track. An adder 106 will be described later.

The 4D sum signal received from the 4D summing circuit 40 after elimination of the information signal, out of the sum signal, of the error signal detector through a low-pass filter is inputted to a differentiator 108.

Figure 3A:
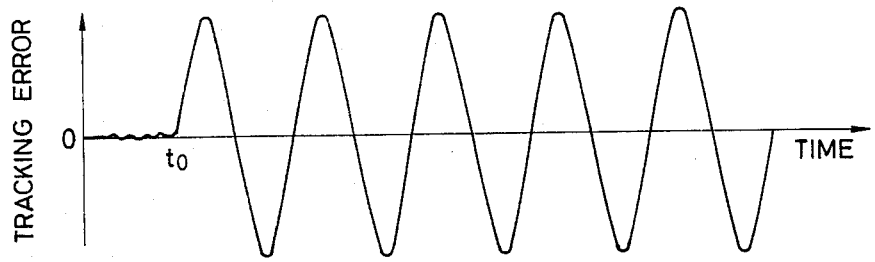
FIGS. 3A–3C, 4A–4F and 5A–5C are time charts respectively explaining the operation performed in an exemplary embodiment of the present invention.
Figure 3B:
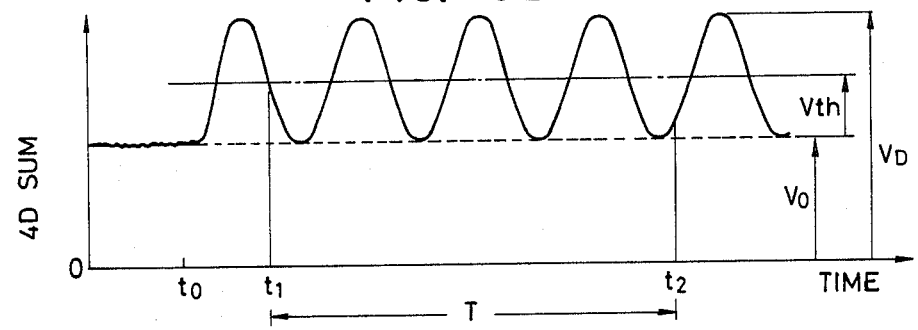

FIG. 3 graphically shows waveforms of a light beam when it traverses the track at and after time $t_0$ due to some external disturbance or the like, in which FIGS. 3A and 3B represent a tracking error signal and a 4D sum signal, respectively. In a normal reproduction state, the 4D sum signal anterior to time $t_0$ has a DC level $V_0$. But after time $t_0$, its level $V_D$ is detected between the tracks. In such 4D sum signal, the DC component is eliminated by the differentiator 108 so that its waveform becomes sinusoidal with the level $V_0$ thereof having a zero volt. It is fed to a detector 110, which then produces a high-level pulse merely for the time during which the level exceeds a threshold value Vth. This output pulse is fed to a counter 122 incorporated in a tracking-off control circuit 120, and a latch signal is outputted from an n-times detecting latch 124 when the counter 122 has counted an n-th pulse. If coincidence is attained between the latch signal and the output pulse of the detector 110 in a decision circuit 126, its output serves to open the loop switch 104 to turn off the tracking servo. And when the output pulse of the detector 110 is fed to the latch 128, a latch signal is produced therefrom to place the counter 130 in its operating state while resetting the same during the presence of the output pulse of the detector 110. Upon extinction of the pulse from the detector 110, the counter 130 is permitted to start its operation, and a timer 132 functions to reset all of the counter 122, the n-times detecting latch 124 and the latch 128 after the lapse of a predetermined time $T_0$, whereby the counter 130 is reset to resume the initial state.

Figure 3C:
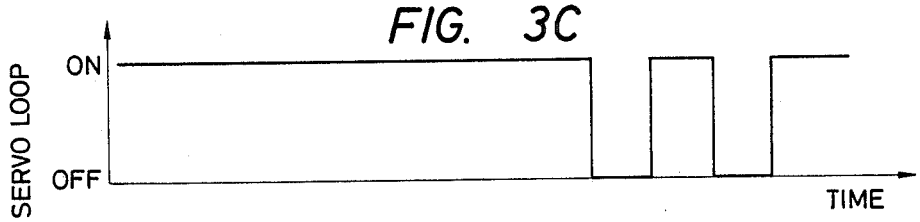

When the 4D sum signal exceeding the threshold value Vth is inputted during the predetermined time $T_0$ as shown in FIG. 3B, the counter 130 is reset by the output pulse of the detector 110, so that a detection is performed for a fixed time from the fall of the last pulse. FIG. 3C shows an exemplary case where the n-times detecting latch 122 performs a fourth detection. The tracking servo is switched off at the fourth and fifth detection when the 4D sum signal has exceeded the threshold value Vth.

In case a tracking deviation is caused by some external disturbance and the light beam traverses the track quickly, the track servo is maintained in its on-state during the traverse of the light beam across the first several tracks, so that a braking action is executed under the servo control to lower the velocity of the light beam movement. Subsequently the track servo is turned off and on so that stable resumption of proper tracking is rendered possible on the positive-feedback slope of the tracking error. If there is generated a signal indicating a tracking deviation due to some deformation of the disc without actual existence of any tracking deviation, such signal is neglected even when generation thereof is repeated a plurality of times within one rotation of the disc, whereby there never occurs a phenomenon that the track servo is turned off erroneously to induce a tracking deviation.

Although in the above example the track servo is turned on and off, the circuit configuration may be so modified as to selectively switch the track servo control frequency to a first frequency characteristic (0 to 3 kHz) or a second frequency characteristic (0 to 60 Hz).

Hereinafter the procedure for resumption of proper tracking will be described with reference to FIGS. 2 and 4A through 4F.

Suppose now that a tracking deviation begins to occur at time $t_0$ due to some external disturbance and the moving light beam is directionally reversed at time $t_r$.

Figure 4A:
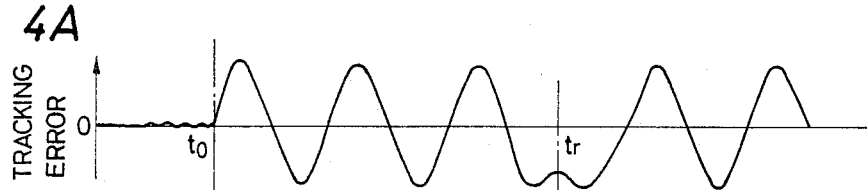
Figure 4B:
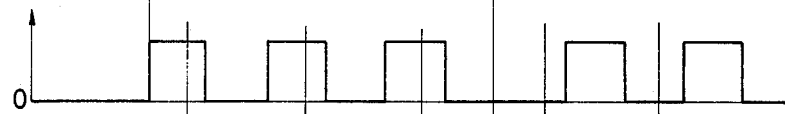
Figure 4C:
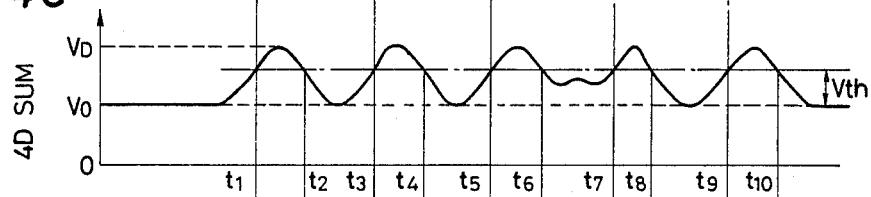
Figure 4D:
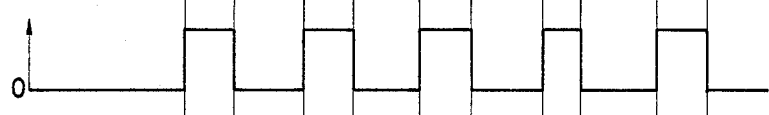
Figure 4E:
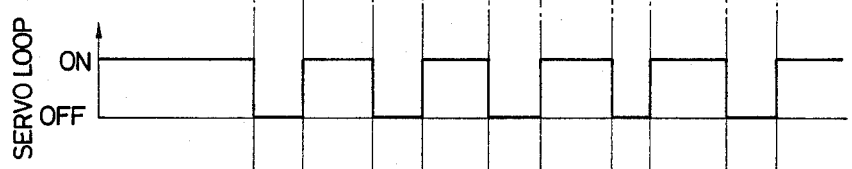
Figure 4F:
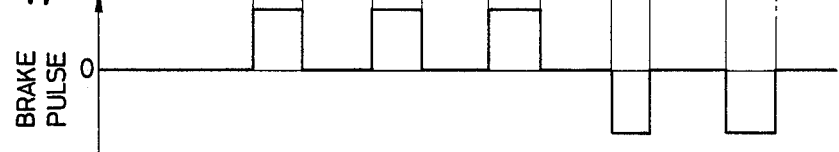

At this moment, a 4D sum signal is produced at a level $V_0$ as shown in FIG. 4C when the light beam is on the track, and its peak has a level $V_D$ when the light beam is between the tracks. The DC component of this signal is eliminated by the differentiator 108 so that it comes to have a sinusoidal waveform with a zero volt at a level $V_0$ and is fed to the detector 110, which then produces output pulses of FIG. 4D merely during the time the signal waveform exceeds the threshold voltage Vth. In case the tracking deviation occurs slowly, the detector 110 produces a loop switching signal of FIG. 4E to open the loop switch 104 during the detection of the 4D sum, thereby turning off the tracking servo. The tracking error signal is shaped into pulses of FIG. 4B by a waveform shaper 142 incorporated in the first brake circuit 140. The pulses thus formed are fed to a polarity decision circuit 144, which serves to decide the polarity at the rising edges t1, t3, t5, t7 and t9 of the output of the detector 110 as shown in FIG. 4D. The decision signal is then fed to a pulse generator 146, which produces a brake signal of FIG. 4F and feeds it to an adder 106. The brake signal is amplified by an amplifier and is applied to a coil 26' of the tracking driver in the direction to impede the movement of the light beam.

In the circuit configuration mentioned above, application of the brake signal conforming to the polarity accomplishes prompt resumption of proper tracking upon occurrence of any tracking deviation.

Now with reference to FIGS. 2 and 5A through 5C, an explanation will be given on some examples of varying the braking force in accordance with the velocity of the moving light beam at a tracking deviation.

Normally the current flowing in the coil 26' of the tracking driver is detected by a resistor incorporated in the slider control circuit 52 and then is phase-compensated by a phase comparator. Subsequently the current is amplified through a switch by an amplifier in the slider driver 54 to become a driving current for the slide actuating motor 50, whereby the optical head is driven from the inner circumference toward the outer circumference to enable follow-up of the track from the inner circumference up to the outer circumference.

Referring now to a jump reproduction mode, first the switch is changed, and a positive or negative voltage outputted from the voltage generator 56 is amplified by the amplifier and is applied to the slide actuating motor 50, so that the slide mechanism is displaced at a constant speed from the inner circumference to the outer circumference or vice versa.

Since the loop switch 104 is closed at this moment, the DC component is gradually increased in the tracking driver coil 26' in accordance with the displacement of the slide mechanism. The lower-frequency component of this voltage is extracted by an integrator 152 incorporated in a second brake circuit 150, while the driving direction of the tracking driver is detected by a direction decision circuit 154, and the loop switch 104 is opened within the maximum movement range of the tracking driver by a limiter 156. A counter 158 is actuated at time $T_0$ when the loop switch 104 is opened, and a cycle detector 162 detects a positive or negative half cycle from a combination of the signal obtained from a timer 160 of a fixed time (T1) within $\frac{1}{4}$ of the natural vibration period T of the tracking driver, the pulse signal obtained out of the tracking error signal through the waveform shaper 142, and the signal obtained from the driving-direction decision circuit 154.

Since the period of the tracking error signal is shorter as the driver speed becomes higher, the driver speed is detected by actuating the counter 164 in the half cycle of such period and holding the counted value by the latch 166. The duration or level of the output pulse produced from the pulse generator 146 is changed in accordance with the counted value (time) thus latched. A great braking force is required when the latched value is small (i.e. when the tracking servo loop is opened at the time the displacement of the tracking driver becomes long due to its eccentricity), so that the output pulse duration of the pulse generator 146 is changed to be wider (or its level is changed to be higher). To the contrary, a small braking force is required when the latched value is great (i.e. when the tracking servo loop is opened at the time the displacement of the tracking driver becomes short due to its eccentricity), so that the above output pulse duration is changed to be narrower (or its level is changed to be lower). The time to start generation of such output of the pulse generator 146 is controlled by a fixed-time detector 168 which produces a detection signal after the lapse of a fixed time (T2) ranging from $\frac{1}{8}$ to $\frac{1}{4}$ of the natural vibration period T of the tracking driver posterior to generation of the output from the limiter 156. The output of the pulse generator 146 turned to be positive or negative by the driving-direction decision circuit 154 is fed to the tracking servo loop through the adder 106 and then is applied to the tracking driver coil 26' in the direction to impede its free vibration.

Figure 5A:
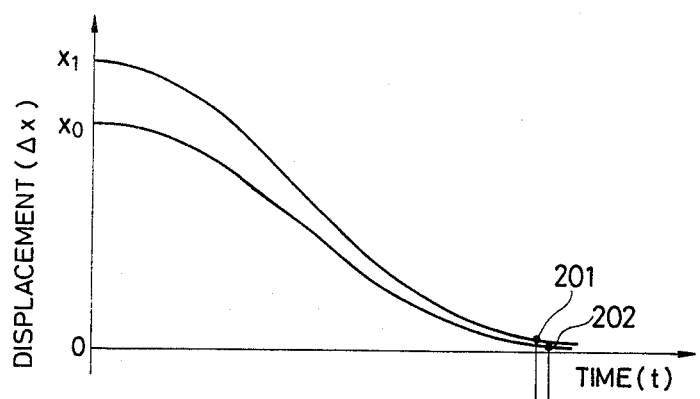
Figure 5B:
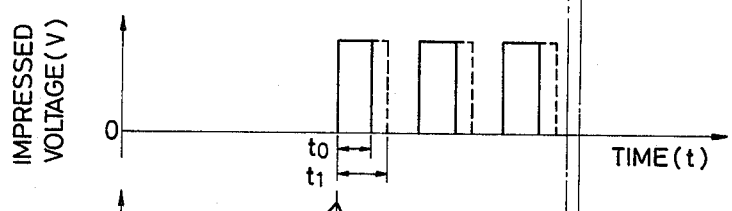
Figure 5C:
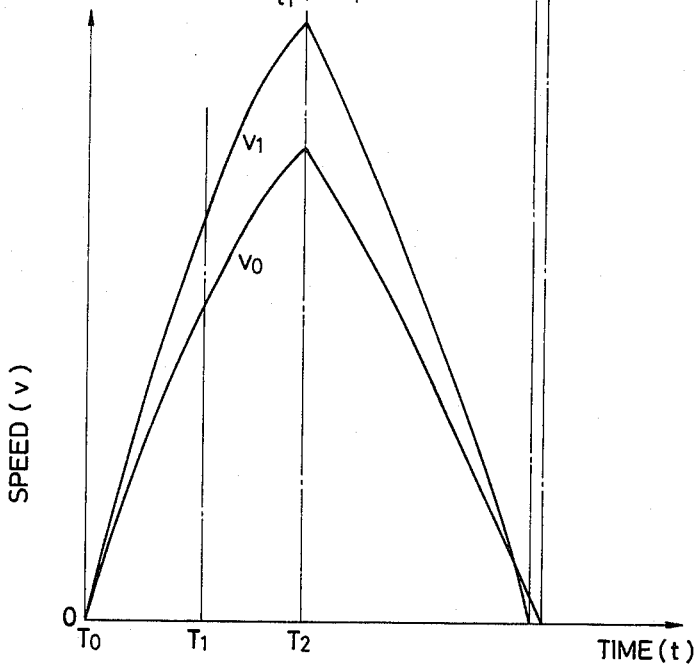

FIGS. 5A through 5C graphically show how resumption of proper tracking is performed in the embodiment of the present invention. In FIG. 5A representing displacements of the driver when the tracking servo loop is opened, $x_0$ and $x_1$ respectively denote displacements caused by the eccentricity and the deformation. FIG. 5B shows signals fed to the driver to impede the displacement thereof after the lapse of time T2 from opening of the tracking servo loop, wherein a pulse having a duration $t_0$ is applied for the displacement $x_0$, while another pulse having a duration $t_1$ is applied for the displacement $x_1$. And FIG. 5C represents the speeds of the driver corresponding respectively to the displacements $x_0$ and $x_1$. The point of resuming proper tracking is denote by 201 in the case of displacement $x_0$ or by 202 in the case of displacement $x_1$, wherein the difference is reduced with respect to both position and time in resumption of proper tracking, thereby enhancing the resumption stability in the jump reproduction mode.

Thus, according to the present invention, there exists no possibility of inducing failure in resumption of proper tracking with regard to the tracking servo loop in the jump reproduction mode, hence ensuring certain readout of the information.

What is claimed is:

1. A tracking control unit in an information reproducing apparatus, comprising: an optical means for reading out information from a rotating recording medium; a means for enabling a light beam of said optical means under control to follow up a track on said recording medium; a means for detecting any deviation of said light beam from said track; and a means for switching off said follow-up control means when the number of times of said tracking deviation has exceeded a predetermined value within a preset time.

2. The tracking control unit as defined in claim 1, wherein said switching-off means comprises a means for generating output pulses in accordance with the level of the lower-frequency component of the signal reproduced from said optical means, a means for counting said output pulses, and a means for generating an off-signal when the value of said counting means has reached a predetermined value within a preset time.

3. A tracking control unit in an information reproducing apparatus, comprising: an optical means for reading out information from a rotating recording medium; a means for enabling a light beam of said optical means under control to follow up a track on said recording medium; a means for detecting any deviation of said light beam from said track; a means for switching off said follow-up control means at the occurrence of a tracking deviation and when said light beam is between tracks; a means for applying a braking force to impede the movement of said light beam during the action of said switching-off means; and a means for changing the polarity or direction of said braking force in accordance with the tracking error signal produced at the occurrence of a tracking deviation.

4. The tracking control unit as defined in claim 3, further including a means for adjusting said braking force in accordance with the velocity of the light beam movement at the time of said tracking deviation.

5. A tracking control unit in an information reproducing apparatus, comprising: an optical means for reading out information from a rotating recording medium; a means for enabling a light beam of said optical means under control to follow up a track on said recording medium; a means for detecting any deviation of said light beam from said track; a means for switching off said follow-up control means when the number of times of tracking deviation within a preset time has exceeded a predetermined value and during the period in which the light beam is between tracks; a means for applying a braking force to impede the movement of said light beam during the action of said switching-off means; and a means for changing the polarity or direction of said braking force in accordance with the tracking error signal produced at the occurrence of a tracking deviation.

6. The tracking control unit as defined in claim 5, wherein said switching-off means comprises a means for generating output pulses in accordance with the level of the lower-frequency component of the signal reproduced from said optical means, a means for counting said output pulses, and a means for generating an off-signal when the value of said counting means has reached a predetermined value within a preset time.

7. The tracking control unit as defined in claim 5, further including a means for adjusting said braking force in accordance with the velocity of the light beam movement at the time of said tracking deviation.

* * * * *